March 31, 1970     G. R. WEBER     3,503,596
CORROSION INHIBITION BY HEAT TREATMENT
Filed Oct. 25, 1967
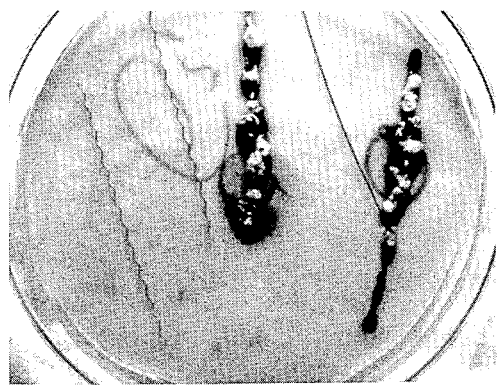
INVENTOR.
GEORGE R. WEBER
BY
ATTORNEY United States Patent Office 3,503,596
Patented Mar. 31, 1970

3,503,596
CORROSION INHIBITION BY HEAT TREATMENT
George R. Weber, Cincinnati, Ohio, assignor to National Distillers and Chemical Corporation, New York, N.Y., a corporation of Virginia
Filed Oct. 25, 1967, Ser. No. 678,491
Int. Cl. F27b 5/00
U.S. Cl. 263—52           6 Claims

ABSTRACT OF THE DISCLOSURE

A process for inhibiting the corrosion of a metal object according to which the object is autoclaved for a time period of at least 72 hours in order to inhibit the autotrophic agents associated with the corrosion.

---

This invention relates to the inhibition of metal corrosion, and more particularly, to a heat treatment technique for preventing or, at least, significantly inhibiting the corrosion of metals, and especially for inhibiting the corrosion of aluminum.

There has been a considerable degree of interest for many years in the prevention of metal corrosion. However, what has been lacking is sufficient insight into the mechanisms of the corrosion of metals such that the root of the problem, i.e. the source of such corrosion, could be attacked. This is true despite the fact that certain knowledge has been gained of corrosion in special environments. In some instances of corrosion, for example, in the burial of iron pipe and the like, it has been known that there is a link between the presence of certain bacteria in that kind of environment and the corrosion produced in the object located therein. For example, in U.S. 2,769,921 a form of corrosion affecting well casings has been described. That form of corrosion has been understood to be indirectly caused by so-called "sulphate reducing bacteria" which exist under anaerobic conditions and reduce naturally-occurring sulphates to hydrogen sulphide; the hydrogen sulphide, in turn, attacking the iron to form iron sulphide, which is the final corrosive end product, so to speak. As is also noted in the same patent, in other instances corrosion may be brought about by the presence of so-called "iron bacteria." Other prior art knowledge relative to microbiological corrosion is contained, for example, in U.S. 2,979,377.

A basic discovery that has been made by me is that in ordinary metal corrosion a very large role is played by autotrophic agents.

It has been repeatedly demonstrated that these agents are more resistant to autoclaving techniques than conventional microorganisms. Sulfate reducing bacterial and related forms responsible for a specific type of corrosion referred to in patents cited herein are readily destroyed by autoclaving at 121° C. for 20 minutes. On the contrary, the autotrophic agents in consideration in this discovery are far more resistant, surviving 24 to 48 hours continuous autoclaving at 121° C. Whether these autotrophic agents are organic or inorganic is open to some question; however, examples of the activity of such agents have been found in such prosaic items as heavily corroded automobile bodies or the like. In other words, it has been found that these autotrophic agents are responsible for the very ordinarily encountered corrosion, as contrasted with the special forms of corrosion that are discussed in the previously noted U.S. Patents 2,769,921 and 2,979,377.

This basic discovery of mine, the consequent culture studies and the final result of inhibition of autotrophic agents produced corrosion by antimicrobial agents have been thoroughly described in my copending application Ser. No. 678,492.

In connection with the use of the term "autotrophic microorganism," it is considered useful at this point to note that autotrophic bacteria are those which build their own nutritive substances, e.g. by photosynthesis or chemosynthesis. Since the microorganisms or agents that have been found to be associated with ordinary metal corrosion resemble these autotrophic bacteria, they have been given the same designation. In extended studies of these corrosion producing agents, characteristic spherical fruiting bodies were regularly observed in and about corroding metals by means of an ordinary light microscope. Pursuant to these studies the corrosion-producing agents, i.e. autotrophic agents, were subsequently cultured on media largely inorganic. Further studies under the electron microscope revealed that the spherical fruiting bodies were packed with tiny virus size spirals. The electron diffraction pattern indicated that these fruiting bodies are not inorganic; a diffraction similar to carbon was detected. Although infrared analysis did not show the presence of organic matter, the corrosion-producing agents behave like living organisms in that they appear to go through similar stages, i.e., through a vegetating stage and the aforenoted fruiting body stage.

Whatever their precise nature, these agents have been found in the corrosion of metals such as aluminum, iron, copper and zinc. In order to determine their effects, these agents were cultured. Thereby their growth was enhanced and they were macroscopically observable. Thus, additional analysis could be made of their nature and properties. Since these agents were shown to be culturable on special culture media, and since their general behavior was that of biological agents, it was considered that they might be eliminated, by means of autoclaving. Autoclaving is simply the technique heating an object in an apparatus using superheated steam under pressure.

What has been discovered is that autotrophic agents associated with ordinary metal corrosion can be inhibited by autoclaving. However, such autoclaving must be carried out for extended periods in order to be effective. The present invention rests upon the aforesaid discovery, and is directed to the end of preventing, or at least substantially mitigating, the type of corrosion in ordinary metals, and particularly in aluminum, that is brought about by the action of these autotrophic agents.

Accordingly, it is a fundamental object of the present invention to prevent such autotrophic-agent-produced corrosion in metals by a simple technique of autoclaving a metal object that is subject to such corrosion.

The present invention is particularly applied to the inhibition of corrosion which occurs in aluminum alloy wires. Because of the fact that culture studies had been carried out, in accordance with the teaching of my copending application Ser. No. 678,492, the corrosion of aluminum wires was attempted in line with that teaching. Thus, a group of aluminum wires were placed in contact with certain culture media, namely, those which are reproduced herewith:

TABLE I.—MEDIUM FORMULATION

NO. 933-203-8

Part A

| Chemical ingredients and procedure: | Grams or milliters per 1000 ml.[1] |
|---|---|
| Distilled water [2] | 500 |
| Agar | 20 |
| Yeast extract | 2.5 |
| Urea | 1.5 |
| Autoclaved (121° C.), 20 min. | |

TABLE I.—Continued

Part B

Chemical ingredients and procedure:

| | |
|---|---|
| Distilled water [2] | 500 |
| $MnSO_4 \cdot H_2O$ | 0.05 |
| $CaCl_2 \cdot H_2O$ | 0.1 |
| $Na_2MoO_4 \cdot 2H_2O$ | 0.0025 |
| $KIO_3$ | 0.00125 |
| $AlCl_3 \cdot 6H_2O$ | 0.025 |
| $(NaPO_3)_6$ | 0.25 |
| $CuSO_4 \cdot 5H_2O$ | 0.125 |
| $MgSO_4 \cdot 7H_2O$ | 0.3 |
| $KNO_3$ | 1.5 |
| $NH_4Cl$ | 1.5 |
| $ZnCO_3$ | 0.025 |
| $CoSO_4 \cdot 7H_2O$ | 5.0 |
| Versene Fe-3 (Fisher No. V-14) | 0.6 |
| Malachite green oxalate | 0.005 |
| $(NH_4)_2C_2O_4 \cdot H_2O$ | 0.1 |

Autoclaved (121° C.), 1 hr.
pH of finished medium, 6.2
Blend parts A and B; pour into sterile glassware.

[1] Trace concentrations were prepared from composite mixes. Weights recorded to several decimals are included to show relative proportions used in making stocks.
[2] Distilled water pre-autoclaved 2 hours (121° C.); deionized water has been satisfactorily substituted.

TABLE II.—MEDIUM FORMULATION NO. 970-12-5

Part A

Chemical ingredients and procedure:     Grams or milliters per 1000 ml.[1]

| | |
|---|---|
| Distilled water [2] | 500 |
| Agar | 20 |
| Yeast extract | 1.5 |
| Urea | 1.5 |

Autoclaved (121° C.), 20 min.

Part B

Chemical ingredients and procedure:

| | |
|---|---|
| Distilled water [2] | 500 |
| $MnSO_4 \cdot H_2O$ | 0.05 |
| $CaCl_2 \cdot 2H_2O$ | 0.1 |
| $Na_2MoO_4 \cdot 2H_2O$ | 0.0025 |
| $KIO_3$ | 0.00125 |
| $AlCl_3 \cdot 6H_2O$ | 0.025 |
| $(NaPO_3)_6$ | 0.25 |
| $CuSO_4 \cdot 5H_2O$ | 0.125 |
| $ZnCO_3$ | 0.025 |
| $MgSO_4 \cdot 7H_2O$ | 0.3 |
| $KNO_3$ | 1.5 |
| $NH_4Cl$ | 1.5 |
| $Co(C_2H_3O_2)_2 \cdot 4H_2O$ | 25 |
| Malachite green oxalate | 0.005 |

Autoclaved (121° C.), 1 hr.
pH of finished medium, 6.4
Blend parts A and B; pour into sterile glassware.

[1] See footnote 1 under Table I.
[2] See footnote 2 under Table I.

TABLE III.—MEDIUM FORMULATION NO. 970-12-7

Part A

Chemical ingredients and procedure:     Grams or milliters per 1000 ml.[1]

| | |
|---|---|
| Distilled water [2] | 500 |
| Agar | 20 |
| Urea | 1.5 |

Autoclaved (121° C.), 20 min.

Part B

Chemical ingredients and procedure:

| | |
|---|---|
| Distilled water [2] | 500 |
| $MnSO_4 \cdot H_2O$ | 0.05 |
| $CaCl_2 \cdot H_2O$ | 0.1 |
| $Na_2MoO_4 \cdot 2H_2O$ | 0.0025 |
| $KIO_3$ | 0.00125 |
| $AlCl_3 \cdot 7H_2O$ | 0.025 |
| $(NaPO_3)_6$ | 0.25 |
| $CuSO_4 \cdot 5H_2O$ | 0.125 |
| $ZnCO_3$ | 0.025 |
| $MgSO_4 \cdot 7H_2O$ | 0.3 |
| $KNO_3$ | 1.5 |
| $NH_4Cl$ | 1.5 |
| $Co(C_2H_3O_2)_2 \cdot 4H_2O$ | 25 |
| Malachite green oxalate | 0.005 |

Autoclaved (121° C.), 1 hr.
pH of finished medium, 6.5
Blend parts A and B; pour into sterile glassware.

[1] See footnote 1 under Table I.
[2] See footnote 2 under Table I.

As noted in copending application Ser. No. 678,492, these media were developed as a result of exhaustive tests of various media formulations that were found to be most effective in culturing autotrophic agents.

The groups of aluminum wires were placed into contact with the several media. One of the groups was placed into an autoclave and autoclaving was performed for a period of at least 72 hours at 121° C. (15 p.s.i.g.). The group that was autoclaved did not corrode while the unautoclaved wires corroded under similar conditions. The yield of stable wires varied somewhat.

In order to provide specific examples of the technique of the present invention, the following specifications are herewith set forth. However, it will be understood that these examples are not by way of limitation.

SPECIFIC EXAMPLES

The general procedure was to autoclave aluminum wires (type 56 S) which were cut to 5 centimeter lengths, and aseptically place them on a suitable medium to determine if corrosion would develop. Table IV herewith, shows the effect of autoclaving such wires on subsequent corrosion.

TABLE IV.—EFFECT OF AUTOCLAVING ALUMINUM ALLOY WIRE (TYPE 56 S) ON SUBSEQUENT CORROSION

[Experiment 893-58, medium 970-12-5 (pH 6.3)]

| | Non-autoclaved | Autoclaved (Time in hours, 121° C.) | |
|---|---|---|---|
| | | ⅓ | 72 |
| Total No. of wires | 10 | 10 | 10 |
| Incubation (days): | Number of wires corroded after incubation (23–25° C.) | | |
| 0 | 0 | 0 | 0 |
| 2 | 3 | 4 | 0 |
| 3 | 5 | 4 | 0 |
| 4 | 9 | 9 | 0 |
| 26 | 10 | 9 | 0 |
| (14 months) | 10 | 9 | 0 |

In this test, ten wires which were not autoclaved (121° C.) all corroded after 26 days of incubation. When similar wires were autoclaved for ⅓ hour (20 minutes) after 26 days, 9 of the 10 wires corroded. However, when another set of wires was autoclaved for 72 hours none of the 10 wires corroded after 26 days. In fact, no corrosion was detected after 14 months.

Table V herewith shows a similar experiment employing a somewhat similar medium. After 20 days of incubation, all 10 non-autoclaved wires had corroded, 6 of the 10 autoclaved 20 minutes were corroded but only 2 of the wires autoclaved 72 hours had corroded.

TABLE V.—EFFECT OF AUTOCLAVING ALUMINUM ALLOY WIRE (TYPE 56 S) ON SUBSEQUENT CORROSION
[Experiment 970-210, medium 970-12-7]

|  | Non-autoclaved | Autoclaved (Time in hours, 121° C.) | |
|---|---|---|---|
|  |  | ⅓ | 72 |
| Total No. of wires | 10 | 10 | 10 |
| Incubation (days): | Number of Wires Corroded After Incubation | | |
| 0 | 0 | 0 | 0 |
| 1 | 4 | 0 | 0 |
| 2 | 6 | 0 | 0 |
| 15 | 10 | 4 | 2 |
| 20 | 10 | 6 | 2 |

As media were improved such as to culture additional types of corrosion inducing agents, the percentage of wire remaining non corroded was reduced somewhat. On medium 993-203-8 which is superior to media 970-12-5 and 970-12-7 it was demonstrated by Table VI herewith that wires autoclaved (121° C.) for 96 hours resulted in about one wire out of four (about 23%) which did not corrode and in fact could be used for reinoculation studies.

TABLE VI.—EFFECT OF AUTOCLAVING ALUMINUM ALLOY WIRE (TYPE 56 S) ON SUBSEQUENT CORROSION
[Experiment 970-291, medium 993-203-8]

|  | Non-autoclaved | | Autoclaved (Time in hours, 121° C.) 96 | |
|---|---|---|---|---|
| Total No. of wires | 10 | | 30 | |
| Incubation (days): | Number of wires corroded after incubation | | | |
|  |  | Percent |  | Percent |
| 0 | 0 |  | 0 |  |
| 1 | 8 | 80 | 2 | 7 |
| 2 |  |  | 4 | 13 |
| 3 |  |  | 6 | 20 |
| 4 |  |  | 8 | 26 |
| 5 | 10 | 100 |  |  |
| 7 |  |  | 12 | 40 |
| 11 |  |  | 14 | 47 |
| 16 |  |  | 18 | 60 |
| 21* | 10 | 100 | 23 | 77 |

*Non-corroded wires sacrificed for reinoculation tests.

If the period of autoclaving was extended the percentage of wires which did not corrode was increased. The figure shows 5 wires autoclaved (121° C.) for two weeks. In this group of 5 wires, 3 did not corrode after an initial incubation period of 2 weeks followed by storage in a refrigerator to prevent drying for a period of 15 months at which time the photograph was made.

The figure distinctly shows the heavy corrosion which developed throughout two of the wires with the other three remaining without a trace of corrosion. Similar wires not autoclaved had 80% of the wires corroded in 24 hours with 100% corroded in 5 days (Table VI).

What has been demonstrated is that an effective corrosion-inhibiting technique can be practiced to inhibit the growth of autotrophic microorganisms that have been found to be the cause of ordinary metal corrosion. By autoclaving a typical metal object, such as aluminum alloy wires, for extended periods, inhibition therein can be realized.

While there have been shown and described and pointed out the fundamental novel features of the invention, it will be understood that various omissions and substitutions and changes in the form and details of the invention and in its operation may be made by those skilled in the art without departing from the spirit of the invention. It is the intention, therefore, to be limited only as indicated by the scope of the following claims.

What is claimed is:
1. A process for inhibiting the corrosion of a metal object comprising autoclaving said object for a time period of at least 72 hours.
2. A process as defined in claim 1, wherein said metal object is a wire.
3. A process as defined in claim 1, wherein said metal object is constituted of aluminum.
4. A method for inhibiting the corrosion of metals, which corrosion is due to the presence of autotrophic agents, which comprises inhibiting the growth of such agents by autoclaving a metal object for a time period of at least 96 hours.
5. A process as defined in claim 4, wherein said metal object is a wire.
6. A process as defined in claim 4, wherein said metal object is constituted of aluminum.

References Cited

UNITED STATES PATENTS 2,769,921  11/1956  Wahin et al. _____ 21—2.5
2,979,377  4/1961  Hitzman et al. _____ 21—2.5

EDWARD G. FAVORS, Primary Examiner

U.S. Cl. X.R.
21—2.5; 148—13